(12) United States Patent
Machate et al.

(10) Patent No.: US 12,330,610 B2
(45) Date of Patent: Jun. 17, 2025

(54) APPARATUS FOR GUIDING AIR TOWARD A WHEEL BRAKE OF A MOTOR VEHICLE

(71) Applicant: Dr. Ing. h.c. F. Porsche Aktiengesellschaft, Stuttgart (DE)

(72) Inventors: Stephan Machate, Hainfeld (DE); Marius Imiolczyk, Tamm (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 401 days.

(21) Appl. No.: 17/943,384

(22) Filed: Sep. 13, 2022

(65) Prior Publication Data

US 2023/0130954 A1  Apr. 27, 2023

(51) Int. Cl.
*B60T 5/00* (2006.01)
*B60T 17/04* (2006.01)

(52) U.S. Cl.
CPC ............. *B60T 5/00* (2013.01); *B60T 17/04* (2013.01)

(58) Field of Classification Search
CPC ...... F16D 65/827; F16D 65/847; F16D 65/78; F16D 65/807; F16D 2065/783; F16D 65/128; F16D 13/72; F16D 2065/788; F16D 2300/0212; B60B 2900/513; B60T 5/00; B60C 23/18
See application file for complete search history.

(56) References Cited

U.S. PATENT DOCUMENTS

| | | | | |
|---|---|---|---|---|
| 4,901,826 A | * | 2/1990 | Preiss | B60T 5/00 188/71.6 |
| 5,121,818 A | * | 6/1992 | McComic | B60T 5/00 188/71.6 |
| 2017/0299006 A1 | * | 10/2017 | Shi | F16D 65/847 |

FOREIGN PATENT DOCUMENTS

| | | |
|---|---|---|
| DE | 10306501 A1 | 9/2004 |
| DE | 102007051496 A1 | 4/2009 |
| DE | 102017107747 A1 | 10/2017 |
| DE | 102020006425 A1 | 12/2020 |
| WO | 2015081074 A1 | 6/2015 |

(Continued)

OTHER PUBLICATIONS

JP S6277064 U (May 1987) (Year: 1987).*

(Continued)

*Primary Examiner* — Robert A. Siconolfi
*Assistant Examiner* — Mahbubur Rashid
(74) *Attorney, Agent, or Firm* — Buchanan Ingersoll & Rooney PC

(57) ABSTRACT

Apparatus for guiding air toward a wheel brake of a motor vehicle. The apparatus includes an air guide element, which can be displaced between a retracted rest position, in which the same is retracted in relation to an undercarriage of the motor vehicle, and an extended operating position, in which the same is extended in relation to the undercarriage. The air guide element can be displaced, via a hydraulic adjustment mechanism between the rest position and the operating position. The hydraulic adjustment mechanism includes a hydraulic cylinder and a return element. In the presence of brake actuation, the hydraulic cylinder can be filled with brake fluid in order to displace the air guide element from the rest position to the operating position. In the absence of brake actuation, the return element displaces the air guide element from the operating position to the rest position.

9 Claims, 8 Drawing Sheets

(56) References Cited

FOREIGN PATENT DOCUMENTS

WO      2017151814 A1    9/2017

OTHER PUBLICATIONS

JP H0575034 U (Oct. 1993) (Year: 1993).*
WO 2017151814 A1 (Sep. 2017) (Year: 2017).*
DE 102013224447 A1 (Sep. 2014) (Year: 2014).*

* cited by examiner

APPARATUS FOR GUIDING AIR TOWARD A WHEEL BRAKE OF A MOTOR VEHICLE

CROSS-REFERENCE TO RELATED APPLICATION

This application claims priority to German Patent Application No. 10 2021 127 833.3, filed Oct. 26, 2021, the content of such application being incorporated by reference herein in its entirety.

FIELD OF THE INVENTION

The invention relates to an apparatus for guiding air toward a wheel brake of a motor vehicle and to a motor vehicle.

BACKGROUND OF THE INVENTION

DE 10 2007 051 496 A1, which is incorporated by reference herein, describes a motor vehicle with a front region, wherein a wheel brake is respectively associated with wheels arranged in the front region of the motor vehicle. Via an apparatus, air can be directed toward the respective wheel brake for cooling the same. This apparatus for guiding air has an air guide element designed as a channel, which can be pivoted about an axis of rotation for transferring between a retracted rest position and an extended operating position. In the retracted rest position, the air guide element designed as a channel is retracted in relation to an undercarriage of the motor vehicle in such a way that the same substantially aligns with the bottom surface of the front part. In the extended operating position, an inlet region of the air guide element designed as a channel is pivoted downward, i.e., extended out of the undercarriage.

DE 10 2020 006 425 A1, which is incorporated by reference herein, discloses a further apparatus with which air can be guided toward a wheel brake of a motor vehicle. Here, again, an air guide element can be displaced between a rest position and an operating position.

DE 10 2017 107 747 A1, which is incorporated by reference herein, discloses an air flow deflector for brake cooling. An air guide element can be displaced via a mechanism between a rest position and an operating position.

DE 103 06 501 A1, which is incorporated by reference herein, WO 2017/151 814 A1, which is incorporated by reference herein, and WO 2015/081 074 A1, which is incorporated by reference herein, disclose further art.

SUMMARY OF THE INVENTION

There is a need for an apparatus for guiding air toward a wheel brake, in which the air guide element can be easily and reliably displaced between the rest position and the operating position.

The air guide element can be displaced, at least in sections, via a hydraulic adjustment mechanism between the rest position and the operating position.

The hydraulic adjustment mechanism comprises a hydraulic cylinder and a return element.

In the presence of brake actuation, the hydraulic cylinder can be filled with brake fluid in order to displace the air guide element from the rest position to the operating position.

In the absence of brake actuation, the return element displaces the air guide element from the operating position to the rest position while discharging brake fluid from the hydraulic cylinder.

The apparatus according to aspects of the invention allows a simple and reliable transfer of the air guide element between the rest position and the operating position, as well as vice versa between the operating position and the rest position.

The apparatus according to aspects of the invention is inexpensive, requires little installation space and causes little additional weight. The apparatus according to aspects of the invention does not require any control electronics.

Preferably, in the presence of brake actuation, the hydraulic cylinder can be filled with brake fluid via a brake fluid hose, which, when viewed in a flow direction of the brake fluid caused by the brake actuation, branches off, upstream of a brake caliper of the wheel brake or in the region of the brake caliper of the wheel brake, from a brake fluid line which leads from a brake pressure distributor to the brake caliper of the wheel brake. In the absence of brake actuation, brake fluid can be discharged from the hydraulic cylinder via the brake fluid hose.

Accordingly, the hydraulic cylinder can be provided with brake fluid from the wheel brake in order to transfer the air guide element from the rest position to the operating position. In the presence of brake actuation, the hydraulic cylinder is automatically filled with brake fluid in order to transfer the air guide element from the rest position to the operating position.

In the absence of brake pedal actuation, brake fluid is automatically discharged from the hydraulic cylinder by means of the return element in order to transfer the air guide element from the operating position to the rest position.

Preferably, the return element is a spring element having a linear spring characteristic or a progressive spring characteristic or a degressive spring characteristic. The design of the return element as a spring element is particularly simple and preferred. By selecting a corresponding spring characteristic, the return operation for the air guide element from the operating position to the rest position can be adjusted.

Preferably, a throttle or valve is integrated into the brake fluid hose. The return characteristic for the air guide element from the operating position to the rest position can also be adjusted via the throttle integrated into the brake fluid hose or via the valve integrated into the brake fluid hose.

BRIEF DESCRIPTION OF THE DRAWINGS

Exemplary embodiments of the invention are explained in more detail with reference to the drawing, without being restricted thereto. Shown are.

DETAILED DESCRIPTION OF THE INVENTION

FIGS. 1 to 6 show details of a first embodiment of an apparatus for guiding air toward a wheel brake of a wheel of a motor vehicle.

Figure 1:
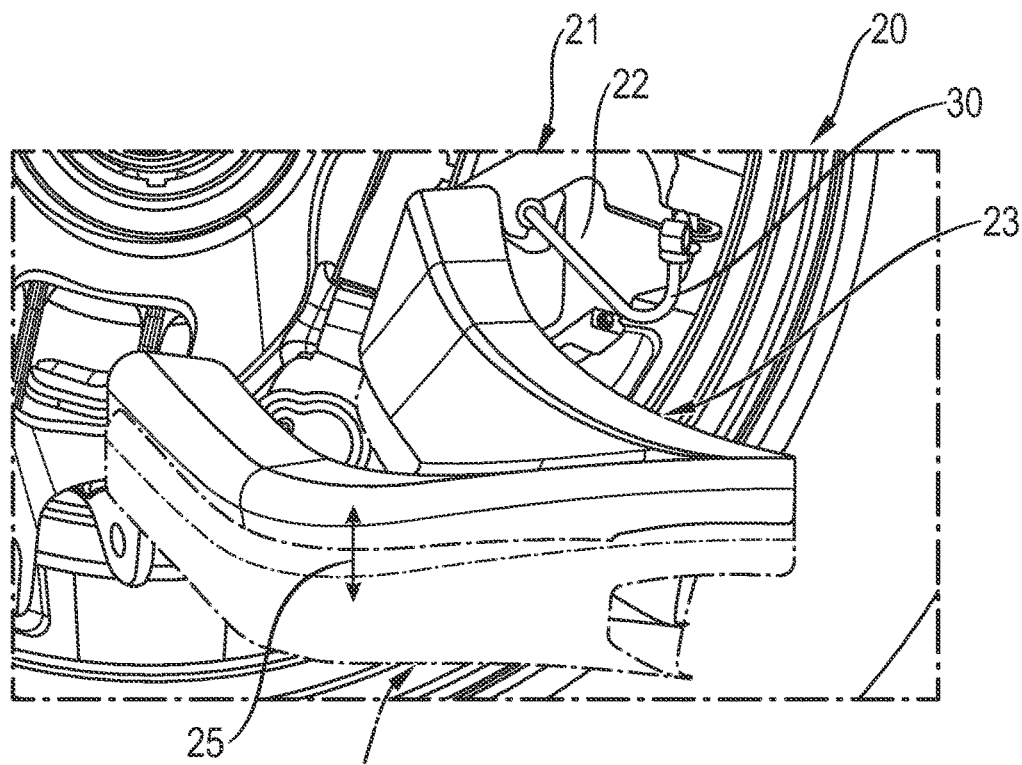
FIG. 1 depicts an inside view of a wheel of a motor vehicle with a first apparatus according to aspects of the invention for guiding air toward a wheel brake of the wheel, wherein an air guide element is shown both in a rest position and in an operating position.

FIG. 1 thus shows in part a wheel 20 as well as a wheel brake 21 which is associated with the wheel 20 and of which a brake caliper 22 is visible. Arranged in the region of the wheel brake 21 is an apparatus for guiding air toward the wheel brake 21, wherein this apparatus comprises an air guide element 23. The air guide element 23 is preferably channel-like and guides air toward a respective wheel brake 21, either directly or via a flow channel 45 connected between the air guide element 23 and the wheel brake 21. The air guide element 23 preferably comprises a first section 46, on which at least one inflow opening 47 for air is formed. At least one outflow opening 49 for air is preferably present on an opposite second section 48 of the air guide element 23.

The air guide element 23 in FIG. 1 is shown in two different states, namely in a retracted rest position on the one hand and in an extended operating position on the other hand. The air guide element is denoted in the retracted rest position by reference sign 23 and in the extended operating position by reference sign 23'.

Figure 3:
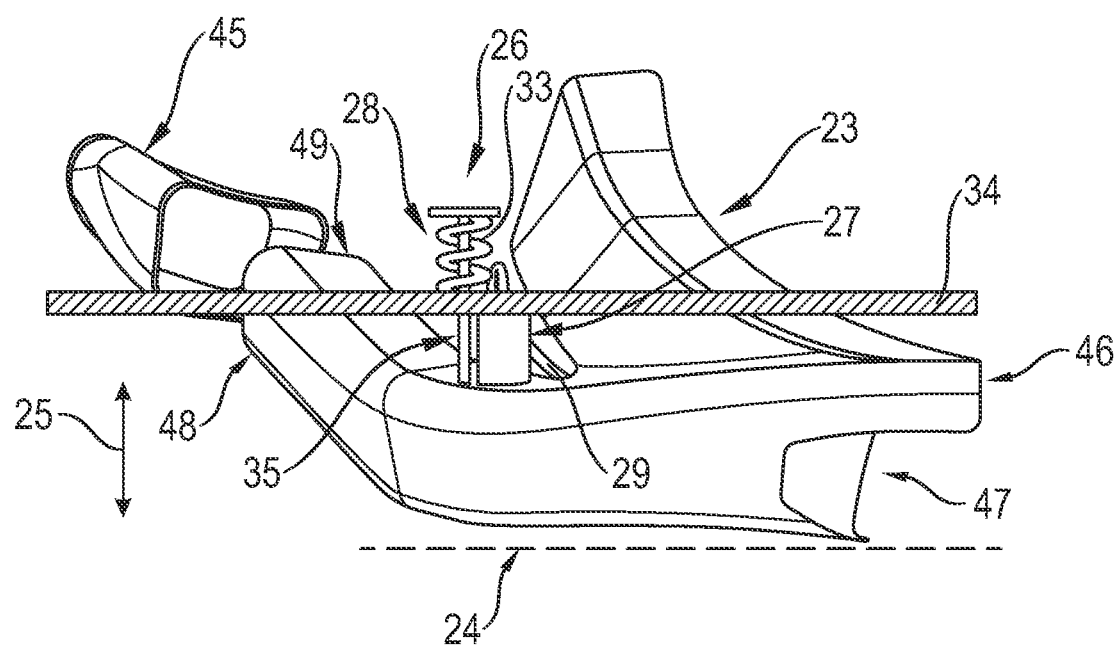
FIG. 3 depicts a detail of FIG. 2 with the air guide element in the rest position.

In the retracted rest position, the air guide element 23 is retracted in relation to an undercarriage 24 of the motor vehicle, and in the retracted rest position, the air guide element 23 therefore does not project downward in relation to the undercarriage 24 (see FIG. 3). In this case, an air flow that flows along the undercarriage 24 then cannot directly flow against the air guide element 23. In the extended operating position (see FIG. 4), on the other hand, the air guide element 23' is extended, at least in sections, in relation to the undercarriage cover 24 in such a way that the air guide element 23 projects downward, at least in sections, in relation to the undercarriage 24. In this state, an undercarriage air flow can then directly flow against the air guide element 23'. The air guide element 23' then increases the air resistance of the motor vehicle.

In the exemplary embodiment of FIGS. 1 to 6, the air guide element 23 as a whole can be displaced translationally in the direction of the double arrow 25, namely in the vertical direction or in the upright direction of the motor vehicle, in order to transfer between the rest position and the operating position.

The air guide element 23, 23' can be displaced via a hydraulic adjustment mechanism 26 between the rest position and the operating position, both from the rest position toward the operating position and vice versa from the operating position toward the rest position. The hydraulic adjustment mechanism 26 comprises a hydraulic cylinder 27 and a return element 28.

In the presence of brake actuation, namely both in the presence of driver-side brake actuation and in the presence of automated brake actuation, the hydraulic cylinder 27 can be filled with brake fluid in order to displace the air guide element 23, 23' from the rest position to the operating position. A brake actuation may also be referred to as a brake demand.

In the absence of brake actuation, the return element 28 displaces the air guide element 23 from the operating position to the rest position while discharging brake fluid from the hydraulic cylinder 27.

The air guide element 23 can be easily and reliably displaced between the rest position and the operating position via the hydraulic adjustment mechanism 26. The hydraulic adjustment mechanism 26 requires little installation space, necessitates very low additional weight, and does not require any control electronics.

In the presence of brake actuation, the hydraulic cylinder 27 of the hydraulic adjustment mechanism 26 can be filled with brake fluid via a brake fluid hose 29.

Figure 2:
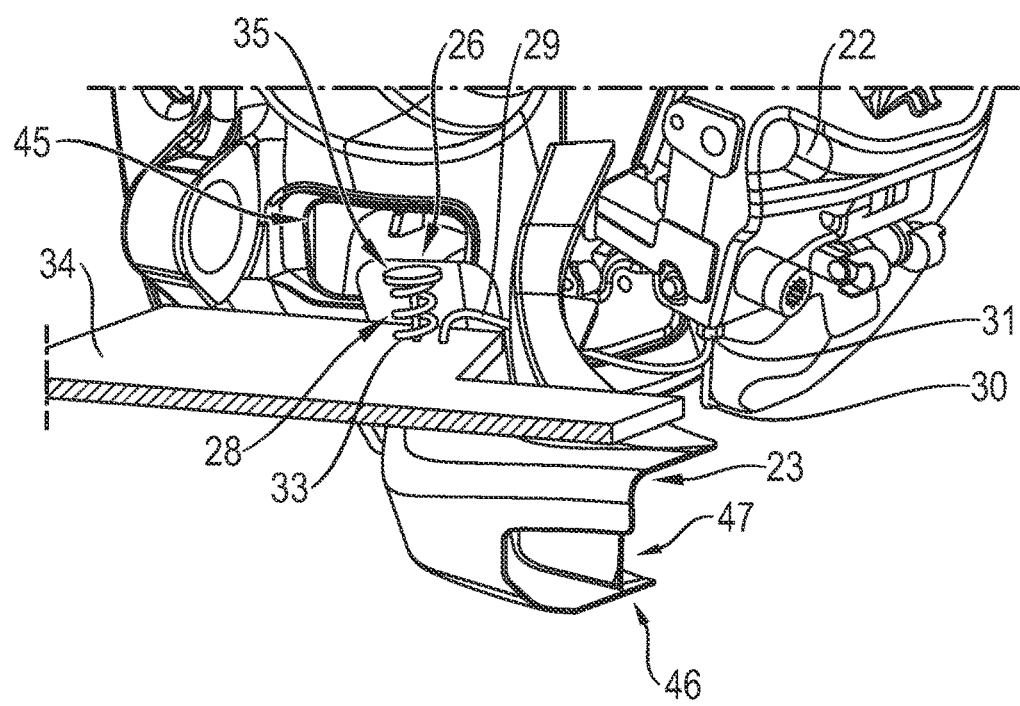
FIG. 2 depicts a detail of FIG. 1 with the air guide element in the rest position.

When viewed in a flow direction of the brake fluid caused by the brake actuation, this brake fluid hose 29 branches off, upstream of the brake caliper 22 of the wheel brake 21 or in the region of the brake caliper 22 of the wheel brake 21, from a brake fluid line 30 which leads from a brake pressure distributor (not shown) to the brake caliper 22 of the wheel brake 21 and through which the brake caliper 22 of the wheel brake 21 is supplied with brake fluid in the presence of brake actuation. FIG. 2 shows a branch-off point 31, in or at which the brake fluid hose 29, which cooperates with the hydraulic cylinder 27 of the hydraulic adjustment mechanism 26, branches off from the brake fluid line 30.

In the absence of brake actuation, brake fluid can be discharged from the hydraulic cylinder 27 of the hydraulic adjustment mechanism 26 via the brake fluid hose 29.

Figure 5:
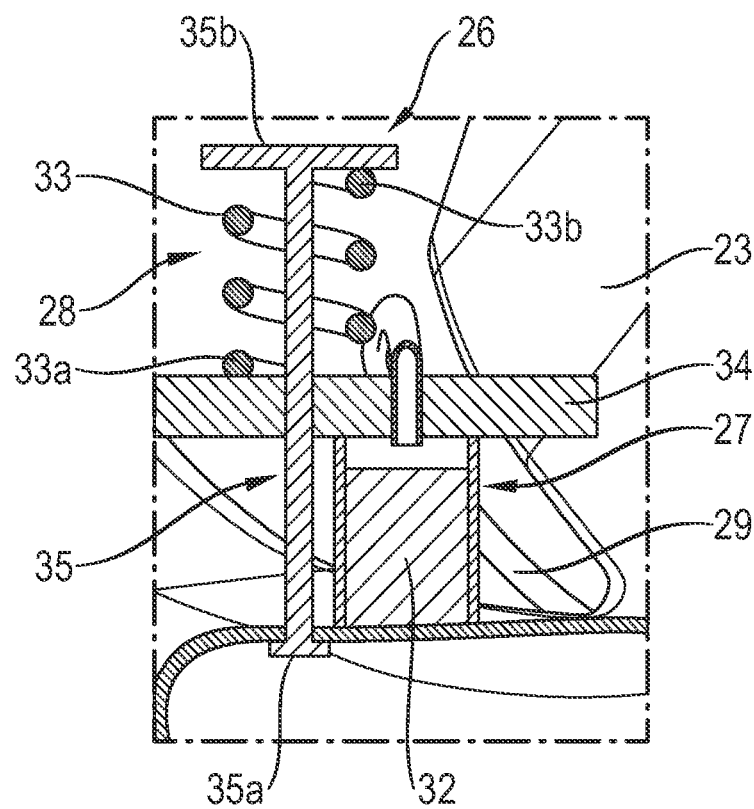
FIG. 5 depicts a detail of FIG. 3.

FIGS. 3 and 5 show details of the air guide element 23 as well as of the hydraulic adjustment mechanism 26 of the apparatus according to aspects of the invention in a state in which the air guide element 23 occupies its retracted rest position. In this state, a hydraulic piston 32 guided in the hydraulic cylinder 27 is retracted into the hydraulic cylinder 27. In this state, the return element 28 pulls the air guide element 23 upward to its rest position.

Figure 4:
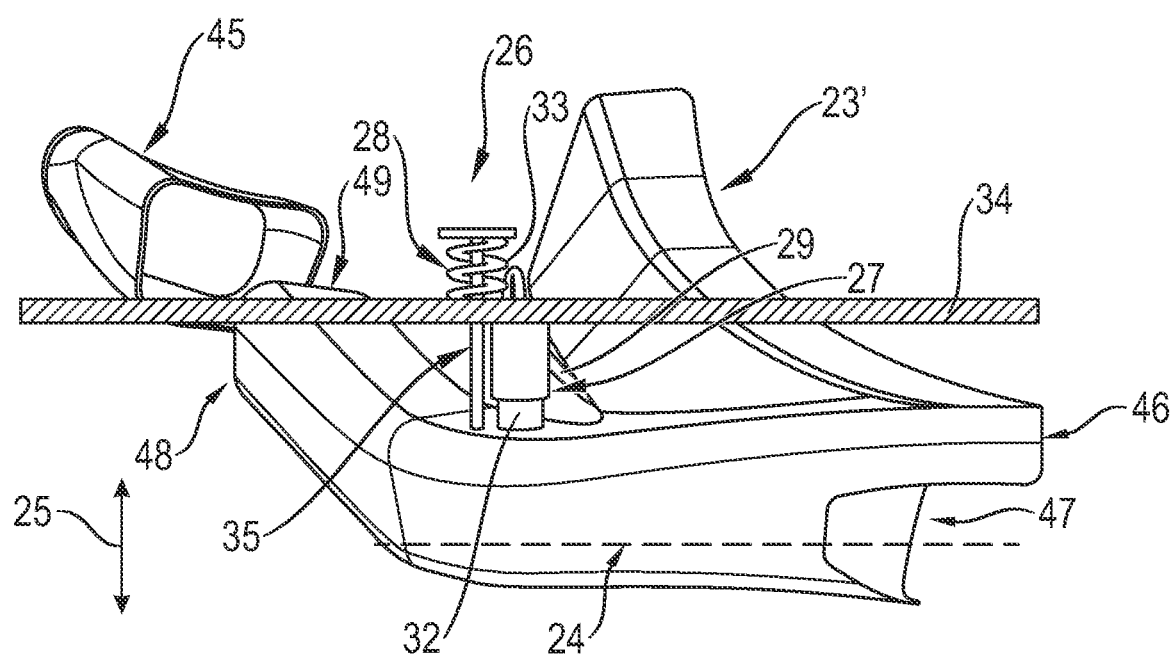
FIG. 4 depicts a detail of FIG. 2 with the air guide element in the operating position.
Figure 6:
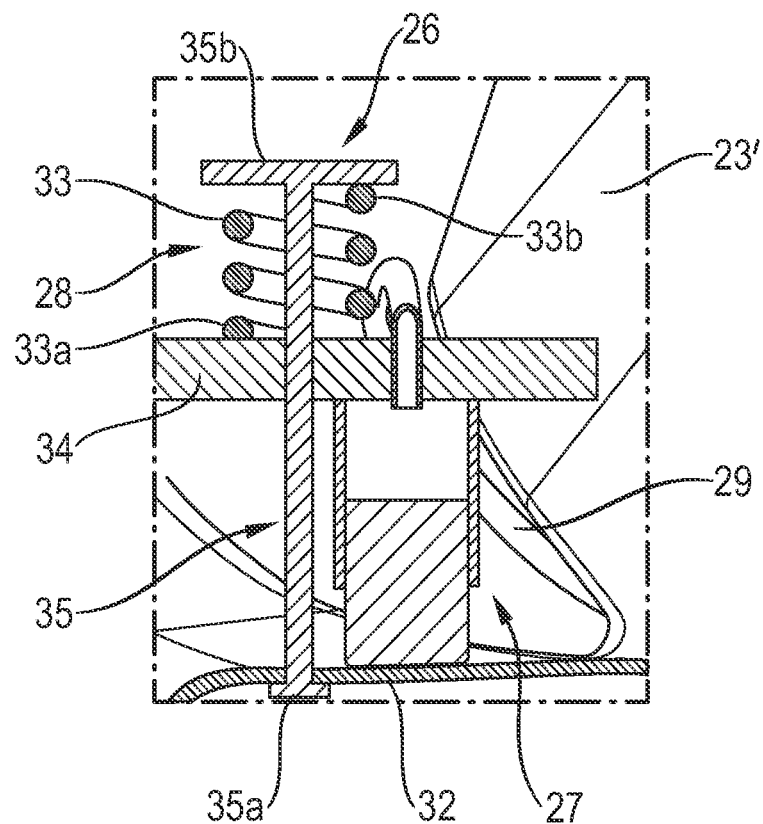
FIG. 6 depicts a detail of FIG. 4.

In FIGS. 4 and 6, which show the air guide element 23' in the operating position, the hydraulic cylinder 27 is filled with brake fluid and the hydraulic piston 32 is extended out of the hydraulic cylinder 27, as a result of which the air guide element 23' is displaced downward to its operating position. This takes place against the return force of the return element 28.

In the exemplary embodiment shown, the return element 28 is designed as a return spring 33, which is supported at a first end 33a on an assembly 34 and at an opposite second end 33b on an actuating rod 35. The assembly 34 may be a fixed body part or may also be a section of a wheel carrier.

When the hydraulic cylinder 27 is not supplied with brake fluid, the spring element 33 pushes the actuating rod 35 upward and, in the process, pulls the air guide element 23 upward to its rest position.

On the other hand, when the hydraulic cylinder 27 is filled with brake fluid, the piston 32 extends out of the hydraulic cylinder 27 and pushes the air guide element 23' downward to its operating position against the spring force of the return spring 33.

The actuating rod 35 is connected to the air guide element 23, 23' via a first end 35a and extends through the assembly 34, wherein the second end 33b of the return spring 33 is supported on the opposite second end 35b of the actuating rod 35.

Figure 7:
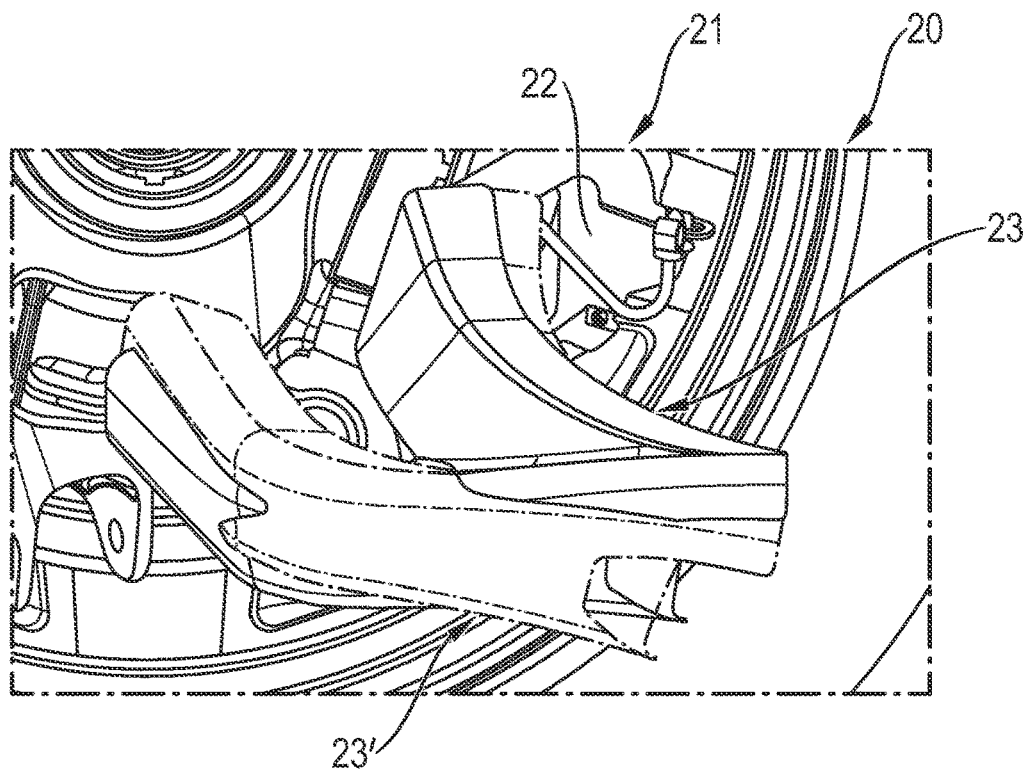
FIG. 7 depicts an inside view of a wheel of a motor vehicle with a second apparatus according to aspects of the invention for guiding air toward a wheel brake of the wheel, wherein an air guide element is shown both in a rest position and in an operating position.
Figure 8:
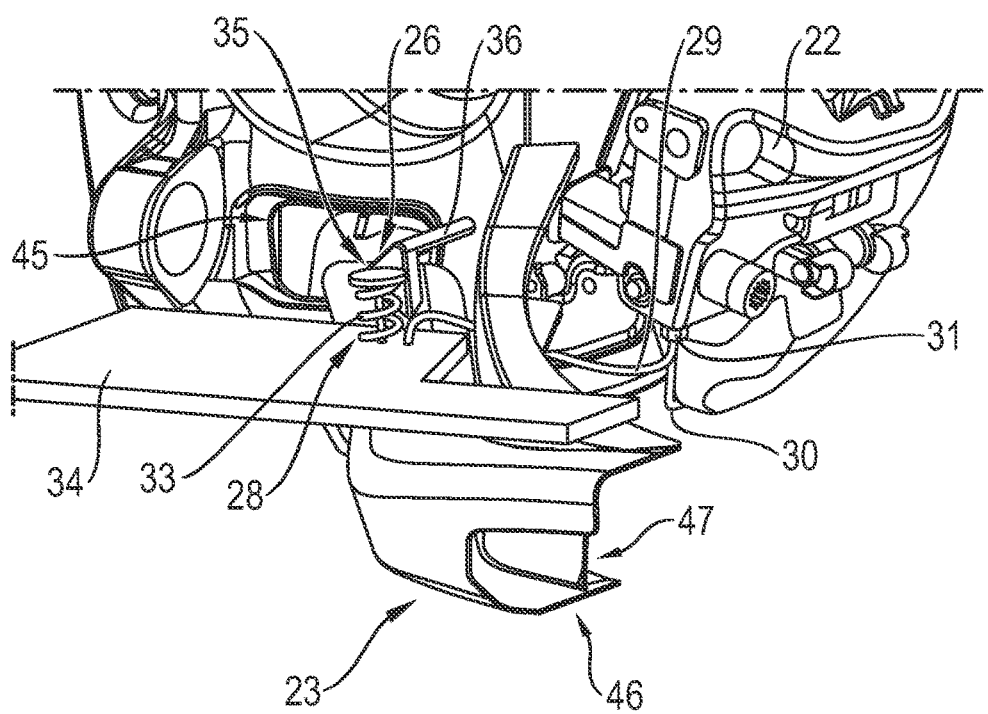
FIG. 8 depicts a detail of FIG. 7 with the air guide element in the rest position.
Figure 9:
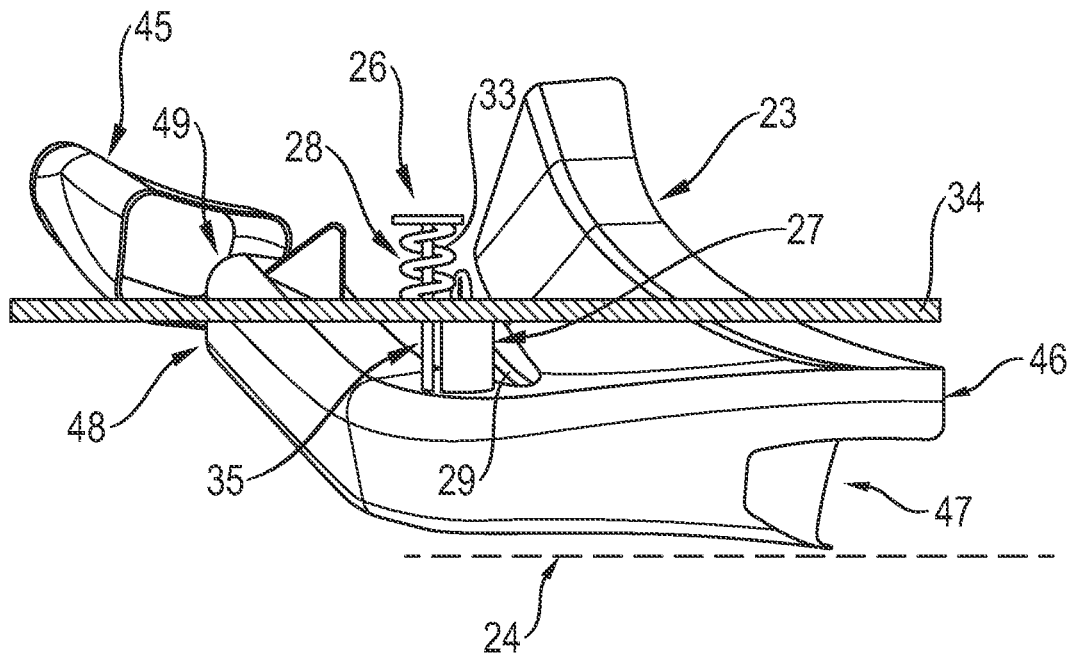
FIG. 9 depicts a detail of FIG. 8 with the air guide element in the rest position.
Figure 10:
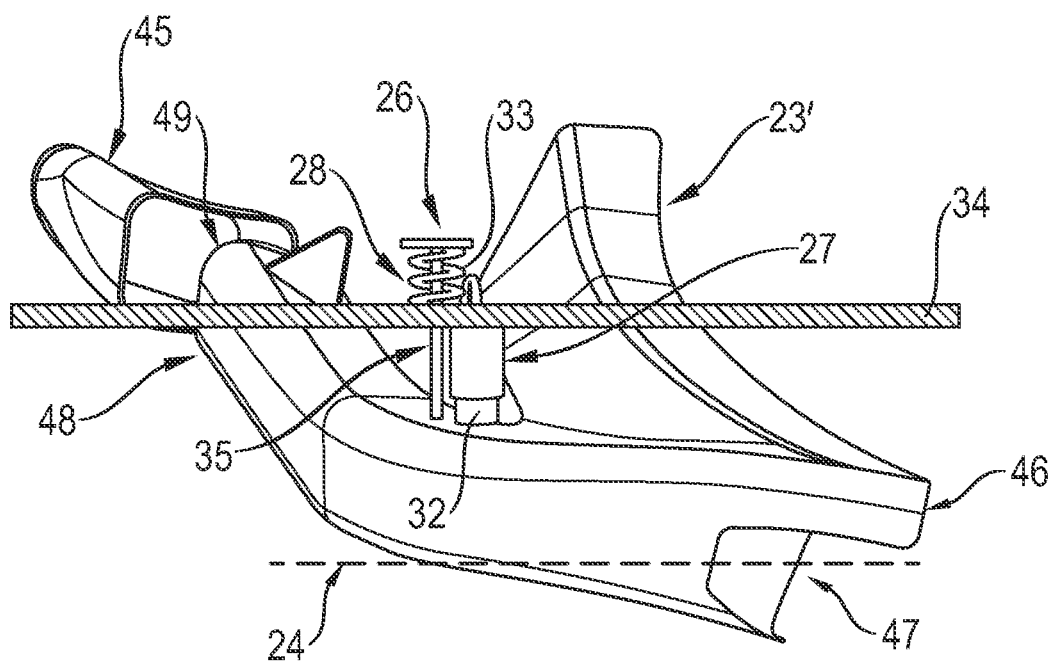
FIG. 10 depicts a detail of FIG. 8 with the air guide element in the operating position.

While in the exemplary embodiment of FIGS. 1 to 6, the air guide element 23, 23' as a whole can be displaced translationally in the vertical direction in order to transfer the same between its rest position and its operating position, FIGS. 7 to 10 show details of a second embodiment of an apparatus according to aspects of the invention for guiding air toward the wheel brake 21 of the motor vehicle, in which the entire air guide element 23, 23' can be pivoted about a pivot axis 36 during the transfer between the rest position and the operating position. FIGS. 7, 9 and 10 thus show that when the air guide element 23, 23' is transferred between the rest position shown in FIG. 9 and the operating position shown in FIG. 10, a pivoting movement or rotation of the air guide element 23 about the pivot axis 36 takes place. This pivoting movement of the air guide element 23 about the pivot axis 36 takes place in such a way that the first section 46 of the air guide element 23, at which the at least one inflow opening 47 is formed, is pivoted, during the transfer of the same from the rest position of FIG. 9 to the operating position of FIG. 10, under the undercarriage 24 of the motor vehicle so that an undercarriage air flow can then flow freely against the first section 46 in the operating position. Except for the difference that in the exemplary embodiment of FIGS. 7 to 10, in contrast to the exemplary embodiment of FIGS. 1 to 6, the air guide element 23, 23' during the transfer between the rest position and the operating position is not displaced translationally but is pivoted about a pivot axis 36, the exemplary embodiment of FIGS. 7 to 10 matches the exemplary embodiment of FIGS. 1 to 6 so that the same reference signs are used for the same assemblies in order to avoid unnecessary repetitions, and reference is made to the above statements on the exemplary embodiment of FIGS. 1 and 6. In particular, the details of FIGS. 5 and 6 are also used in the exemplary embodiment of FIGS. 7 to 10.

Figure 11:
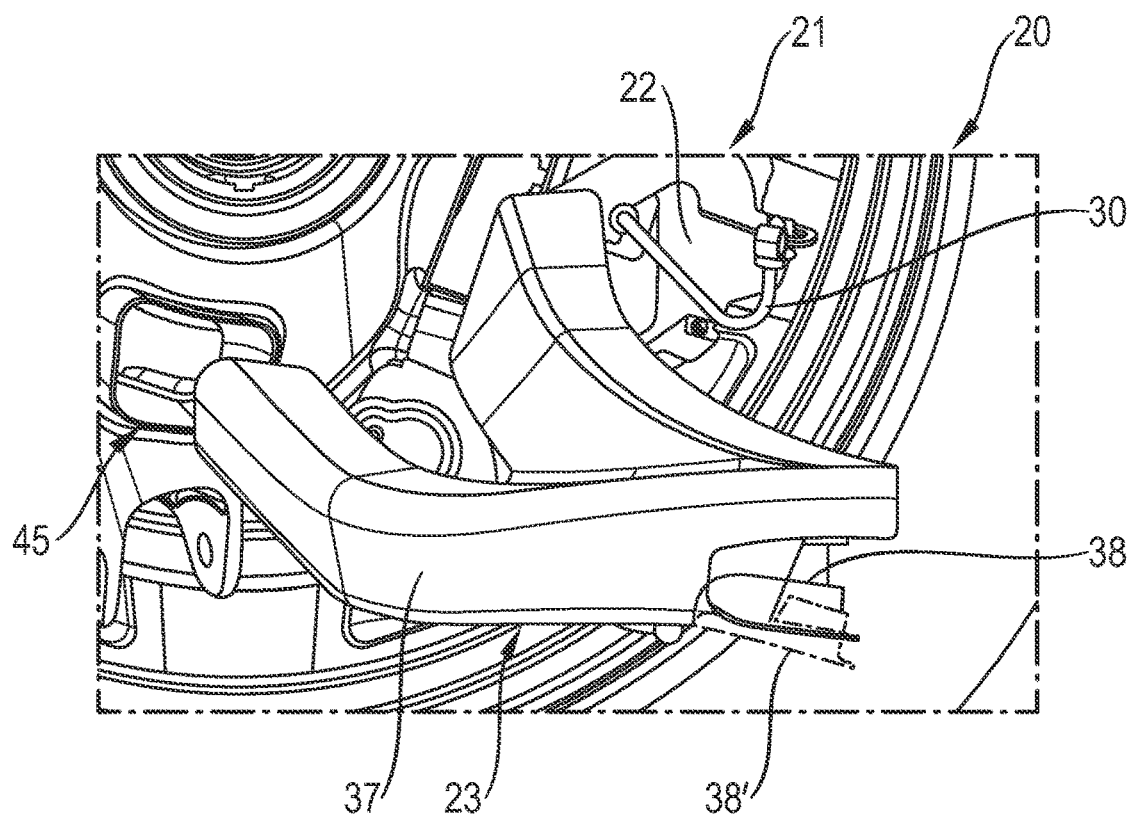
FIG. 11 depicts an inside view of a wheel of a motor vehicle with a third apparatus according to aspects of the invention for guiding air toward a wheel brake of the wheel, wherein an air guide element is shown both in a rest position and in an operating position.
Figure 12:
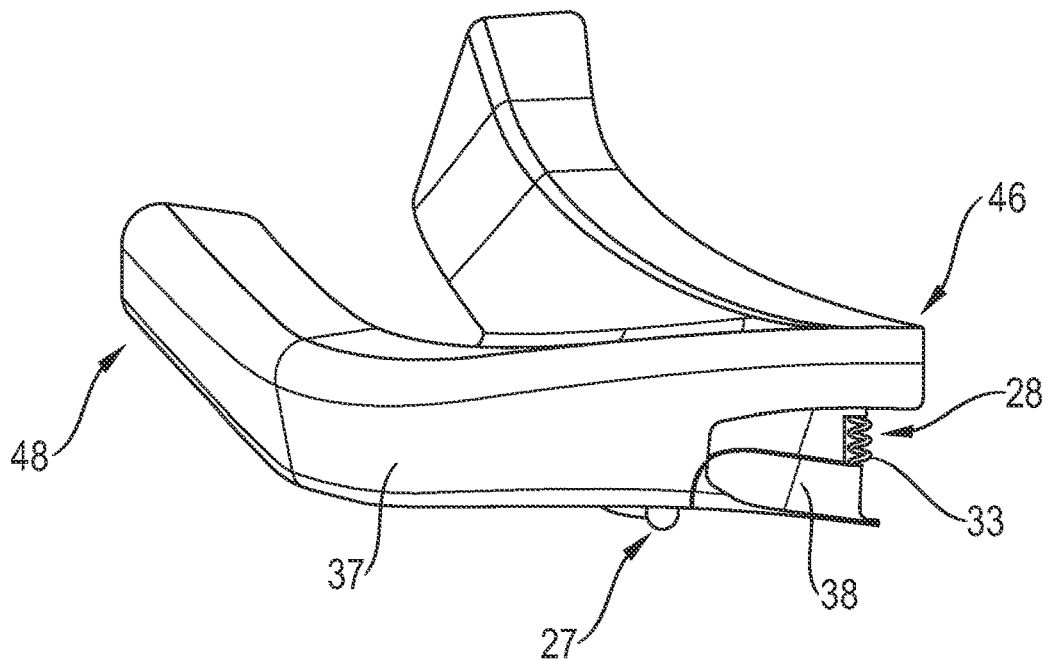
FIG. 12 depicts a detail of FIG. 11 with the air guide element in the rest position.

FIGS. 11 to 16 show details of a further exemplary embodiment of an apparatus according to aspects of the invention for guiding air toward a wheel brake 21. While FIGS. 1 to 6 and FIGS. 7 to 10 show exemplary embodiments in which the air guide element 23, 23' as a whole can be displaced either linearly (FIGS. 1 to 6) or rotationally (FIGS. 7 to 10), FIGS. 11 to 16 show one embodiment of the invention in which the air guide element 23 comprises a fixed base body 37 and, in the region of the first section 46, a tip 38 which is pivotally fastened to the fixed base body 37 and can be displaced between a rest position and an operating position. FIG. 11 shows this tip 38, which can be pivoted relative to the fixed base body 37, in two different states, wherein the rest position is denoted by reference sign 38 and the operating position is denoted by reference sign 38'.

Accordingly, in FIGS. 11 to 16, during the transfer of the air guide element 23 from the rest position to the operating position, not the entire air guide element 23 but only the tip 38, 38', which is pivotally fastened to the fixed base body 37, is displaced. In FIGS. 11 to 16, the air guide element 23 is displaced, in sections, from the rest position to the operating position, while in the exemplary embodiments of FIGS. 1 to 6, FIGS. 7 to 10, the entire air guide element 23 is displaced. In the exemplary embodiment of FIGS. 11 to 16 as well, the displacement of the air guide element 23, namely of the tip 38, 38' of the same, between the rest position and the operating position takes place via a hydraulic adjustment mechanism 26, which comprises the hydraulic cylinder 27 and the return element 28. The hydraulic cylinder 27 can be filled with brake fluid in order to displace the air guide element 23, namely the tip 38 of the same, from the rest position to the operating position in the presence of brake actuation. In the absence of brake actuation, the return element 28 displaces the tip 38 of the air guide element 23 from the operating position to the rest position while discharging brake fluid from the hydraulic cylinder 27.

Figure 13:
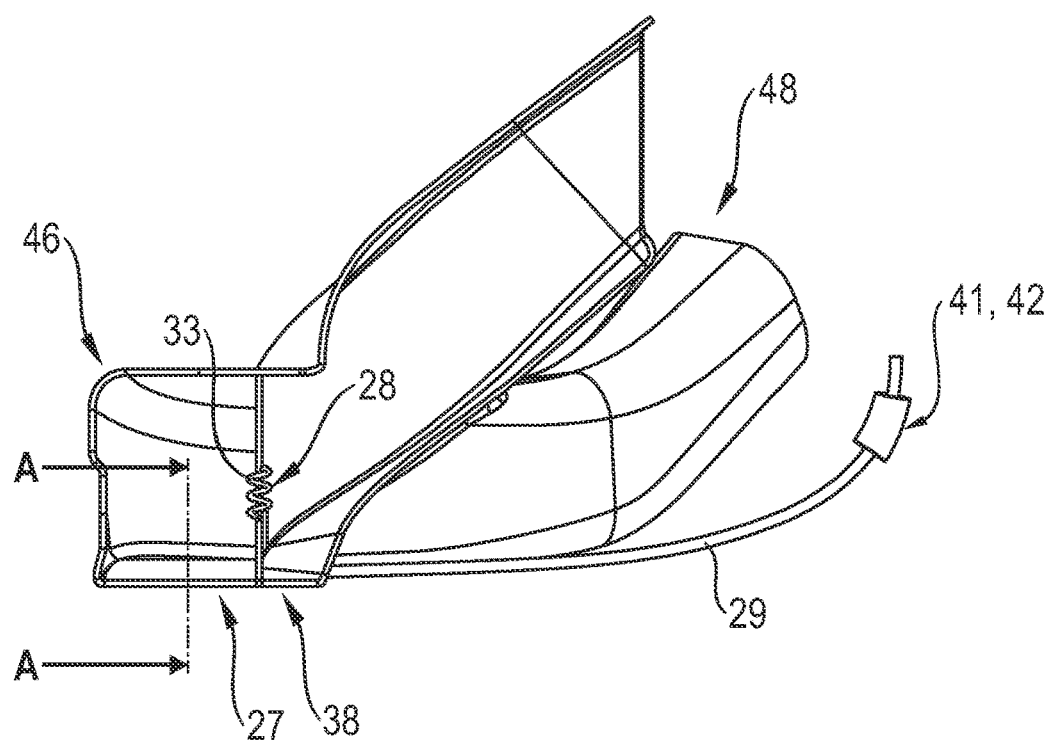
FIG. 13 depicts the detail of FIG. 12 in a different perspective with the air guide element in the rest position.
Figure 14:
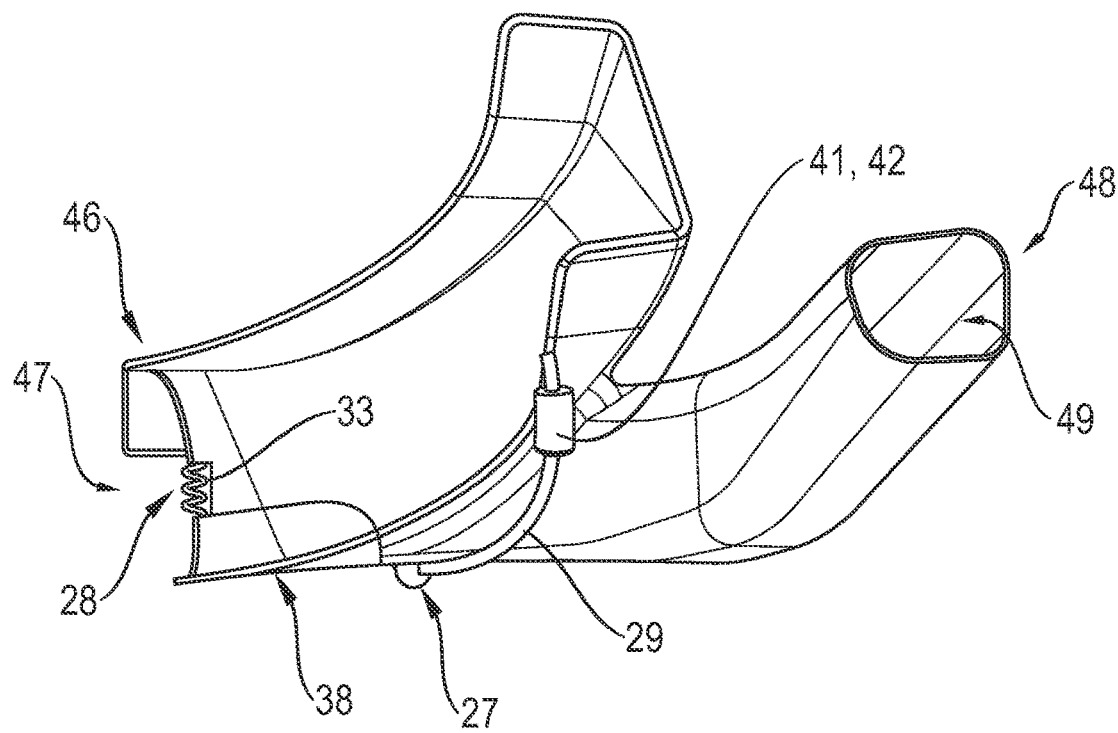
FIG. 14 depicts the detail of FIG. 12 in a further perspective with the air guide element in the rest position.
Figure 15:
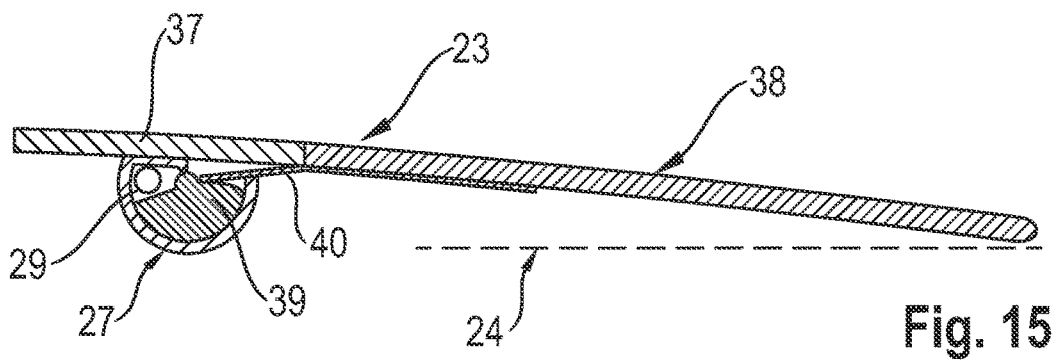
FIG. 15 depicts the cross-section A-A of FIG. 13 with the air guide element in the rest position.
Figure 16:
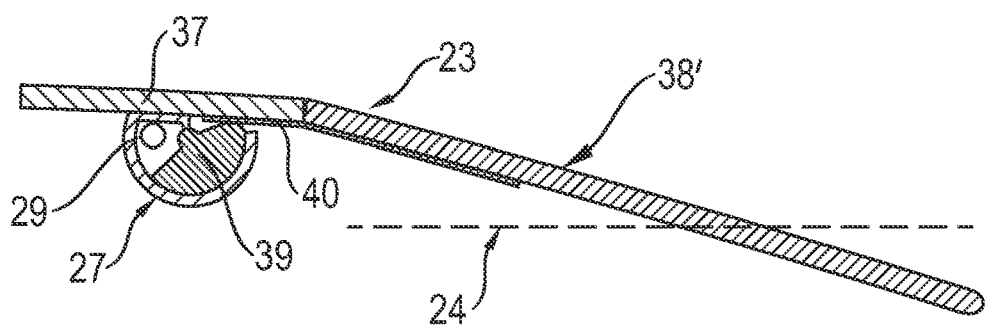
FIG. 16 depicts the cross section A-A of FIG. 13 with the air guide element in the operating position.

While in the exemplary embodiments of FIGS. 1 to 6 and 7 to 10, during the filling or emptying of the hydraulic cylinder 27 with brake fluid, a hydraulic piston 32 is linearly or translationally either retracted into or extended out of the hydraulic cylinder 27, a rotational movement of a hydraulic piston 39, which is accommodated by the hydraulic cylinder 27 and cooperates with an angled lever 40, takes place according to FIGS. 15 and 16 in the exemplary embodiment of FIGS. 11 to 16.

If the hydraulic cylinder 27 is filled with brake fluid via the brake fluid hose 29 in the presence of brake actuation, the hydraulic piston 39 is rotated counterclockwise in the exemplary embodiment of FIGS. 15 and 16, wherein the same then pivots the angled lever 40 and thus the tip 38 of the air guide element 23 downward.

On the other hand, if brake fluid is not supplied to the hydraulic cylinder 27 and the return spring 33 pulls the tip 38 upward from the operating position to the rest position, the hydraulic piston 39 is rotated clockwise and at least partially pushes the brake fluid out of the hydraulic cylinder 27.

As already stated, in the depicted exemplary embodiments, the respective hydraulic cylinder 27 is supplied with brake fluid via a brake fluid hose 29, namely in the presence of brake actuation or brake demand. In the absence of brake actuation, brake fluid can be discharged from the hydraulic cylinder 27 via the brake fluid hose 29. FIGS. 13 and 14 show that a throttle 41 or, alternatively, a valve 42 is associated with brake fluid hose 29. The throttle 41 may be a throttle check unit, the valve 42 may be a Tesla valve, or also a reverse flow valve with time delay. Such a throttle 41 or such a valve 42 may also be associated with the brake fluid hose 29 in the exemplary embodiments of FIGS. 1 to 6 as well as FIGS. 7 to 10.

Figure 17:
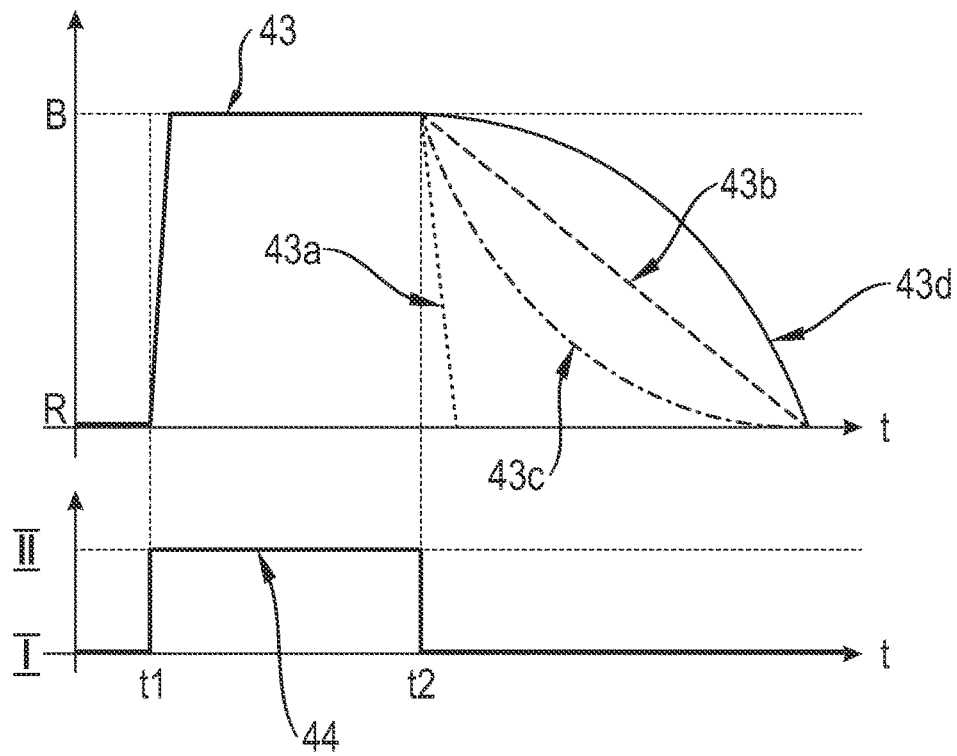
FIG. 17 depicts characteristics for illustrating different characteristics in the transfer of the air guide element to the rest position.

The return element 28 designed as the return spring 33 may have a linear spring characteristic or a progressive spring characteristic or a degressive spring characteristic. Depending on which spring characteristic the return element 28 designed as the return spring 33 has, and depending on whether a throttle 41 or a valve 42 is integrated into the brake fluid hose 29, a defined return characteristic can be adjusted during the transfer of the air guide element 23 from the operating position to the rest position. This is described with reference to FIG. 17, wherein several temporal curve profiles over time t are shown in FIG. 17, namely a position of the air guide element 23 with curve profile 43 and the presence or absence of brake actuation with curve profile 44. The state I for the time curve profile 44 corresponds to the absence of brake actuation, the status II corresponds to the presence of brake actuation, so that brake actuation is accordingly present at time t1, namely up to time t2. According to the curve profile 43, with the presence of the brake actuation at time t1, the air guide element 23 is displaced from the rest position R to the operating position B. This takes place as quickly as possible in order to direct cooling air toward the wheel brake 21 immediately after or with the presence of the brake actuation.

When brake actuation is no longer present at time t2, different curves of the curve profile 43 can be provided for the return behavior of the air guide element 23, i.e., for the transfer of the same from the operating position B to the rest position R, wherein four possible curve profiles 43a, 43b, 43c and 413d are shown by way of example in FIG. 17 for the return behavior of the air guide element 23.

The return behavior according to curve profile 43a results when the return spring 33 has a linear spring characteristic and when neither a throttle 41 nor a valve 42 is integrated into the brake fluid hose 26. If the return spring 33 has a linear spring characteristic and a throttle check unit is integrated into the brake fluid hose 29, the curve profile 43b may be provided.

If the return spring 33 has a degressive spring characteristic and a throttle check unit is integrated into the brake fluid hose 29, the curve profile 43c may be provided. On the other hand, if the return spring 33 has a progressive spring characteristic and a throttle check unit is integrated into the brake fluid hose 29, the curve profile 43d may be provided.

This allows the return behavior of the air guide element 23 from the operating position B to the rest position R to be influenced and the air guide element 23 to also be left in a defined manner in the air flow after the disappearance of a brake actuation at time t2, in order to continue to cool the wheel brake 21 even after the disappearance of the brake actuation.

The invention furthermore relates to a motor vehicle which comprises a plurality of wheels 20 with wheel brakes 21. Preferably, an apparatus according to aspects of the invention for guiding air toward the respective wheel brake 21 is associated with each wheel 20 comprised by a wheel brake 21. Said apparatus is designed as described above.

The motor vehicle is in particular an electric vehicle. In an electric vehicle, the apparatus according to aspects of the invention can be particularly advantageously used to increase the range of the electric vehicle. Only in the event of and immediately after the presence of brake actuation or brake demand is the air guide element 23, which may also be referred to as a brake spoiler, displaced to the operating position and increases the air resistance of the motor vehicle. In the absence of braking actuation or brake demand, the air guide element 23 is displaced to the rest position, air does not flow directly against it, and it does not increase the air resistance of the motor vehicle.

What is claimed is:

1. An apparatus for guiding air toward a wheel brake of a motor vehicle, said apparatus comprising:
   an air guide element, which is configured to be displaced between a retracted rest position, in which the air guide element is retracted in relation to an undercarriage of the motor vehicle, and an extended operating position, in which the air guide element is extended, at least in sections, in relation to the undercarriage of the motor vehicle, and
   a hydraulic adjustment mechanism for displacing the air guide element, at least in sections, between the rest position and the operating position, wherein the hydraulic adjustment mechanism comprises a hydraulic cylinder and a return element,
   wherein in a presence of brake actuation, the hydraulic cylinder can be filled with brake fluid in order to displace the air guide element from the rest position to the operating position,
   wherein in an absence of brake actuation, the return element displaces the air guide element from the operating position to the rest position while discharging brake fluid from the hydraulic cylinder,
   wherein in the presence of brake actuation, the hydraulic cylinder can be filled with brake fluid via a brake fluid hose which branches off, upstream of a brake caliper of the wheel brake or in a region of the brake caliper, from a brake fluid line which leads from a brake pressure distributor to the brake caliper of the wheel brake.

2. The apparatus according to claim 1, wherein in the absence of brake actuation, brake fluid can be discharged from the hydraulic cylinder via the brake fluid hose.

3. The apparatus according to claim 1, wherein the return element is a spring element.

4. The apparatus according to claim 3, wherein the spring element has a linear spring characteristic.

5. The apparatus according to claim 3, wherein the spring element has a progressive spring characteristic.

6. The apparatus according to claim 3, wherein the spring element has a degressive spring characteristic.

7. The apparatus according to claim 1, further comprising a throttle integrated into the brake fluid hose.

8. The apparatus according to claim 1, further comprising a valve integrated into the brake fluid hose.

9. A motor vehicle comprising:
   a plurality of wheels,
   wheel brakes associated with the wheels, and
   the apparatus of claim 1 for guiding air toward one of the wheel brakes.

* * * * *

UNITED STATES PATENT AND TRADEMARK OFFICE
CERTIFICATE OF CORRECTION

Page 1 of 1

PATENT NO. : 12,330,610 B2
APPLICATION NO. : 17/943384
DATED : June 17, 2025
INVENTOR(S) : Stephan Machate and Marius Imiolczyk It is certified that error appears in the above-identified patent and that said Letters Patent is hereby corrected as shown below:

On the Title Page

(30) Foreign Application Priority Data should read:
Oct 26, 2021 (DE)....................10 2021 127 833.3

Signed and Sealed this
Twenty-second Day of July, 2025

Coke Morgan Stewart
*Acting Director of the United States Patent and Trademark Office*